United States Patent [19]

Caron

[11] Patent Number: 5,267,467
[45] Date of Patent: Dec. 7, 1993

[54] MASS AIR FLOW SENSOR TWO TEMPERATURE PRODUCTION LINE TEST APPARATUS

[75] Inventor: Richard W. Caron, Canton, Mich.

[73] Assignee: Ford Motor Company, Dearborn, Mich.

[21] Appl. No.: 919,314

[22] Filed: Jul. 27, 1992

[51] Int. Cl.$^5$ ............................................. G01M 19/00
[52] U.S. Cl. ........................................... 73/3; 73/118.2
[58] Field of Search ........................... 73/116, 118.2, 3

[56] References Cited

U.S. PATENT DOCUMENTS

| | | | |
|---|---|---|---|
| 2,755,663 | 7/1956 | Smith et al. | 73/116 |
| 3,026,706 | 3/1962 | Halsell et al. | 73/3 |
| 3,226,973 | 1/1966 | Evans et al. | 73/3 |
| 3,469,442 | 9/1969 | Brueckner | 73/118 |
| 4,590,790 | 5/1986 | Hicks et al. | 73/3 |

FOREIGN PATENT DOCUMENTS 1538130  1/1990  U.S.S.R. ................... 73/3

Primary Examiner—Jerry W. Myracle
Attorney, Agent, or Firm—Roger L. May; Peter Abolins

[57] ABSTRACT

A two temperature test apparatus for a mass air flow sensor having a cold test station disposed in a cold test chamber and a hot test station disposed in a hot test chamber. A first air manifold connects the cold test chamber with a vacuum chamber. The first air manifold includes a sonic nozzle controlling the air flow through the first air manifold. A second air manifold connects the cold test station to the hot test station. A third air manifold connects the hot test station to an air filter within the hot test chamber. The mass air flow sensor is mounted on a production carrier having a transverse air passage receiving the sensing head of the mass air flow sensor. The transverse air flow passage of the carrier in the cold test station connects the first air manifold to the second air manifold and the transverse air flow passage of the carrier in the hot test station connects the second air manifold to the third air manifold. An electrical control energizes the mass air flow sensors in the cold and hot test stations and stores the output signal.

20 Claims, 4 Drawing Sheets

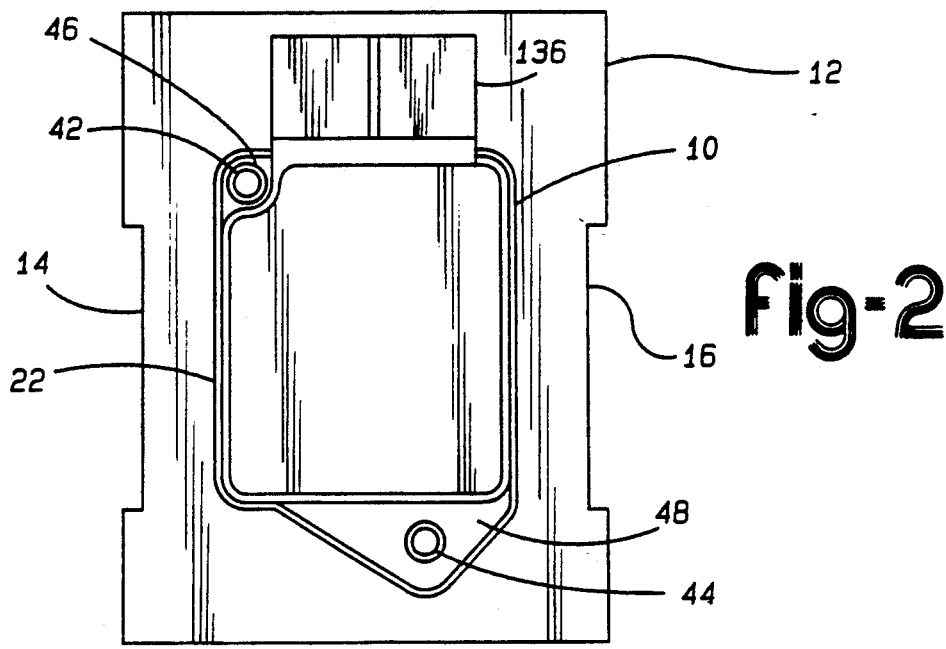
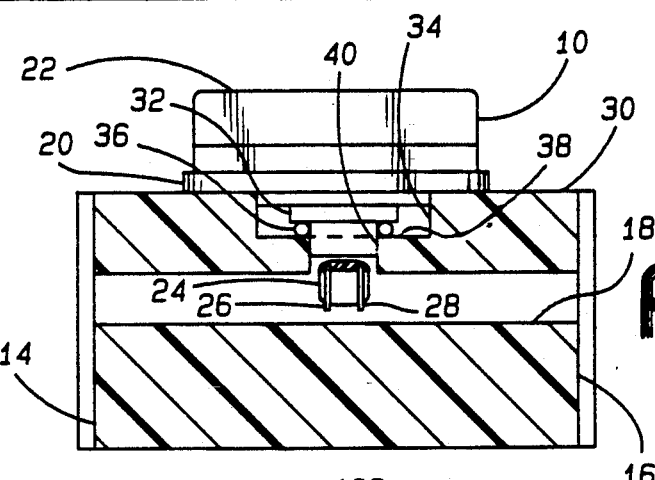
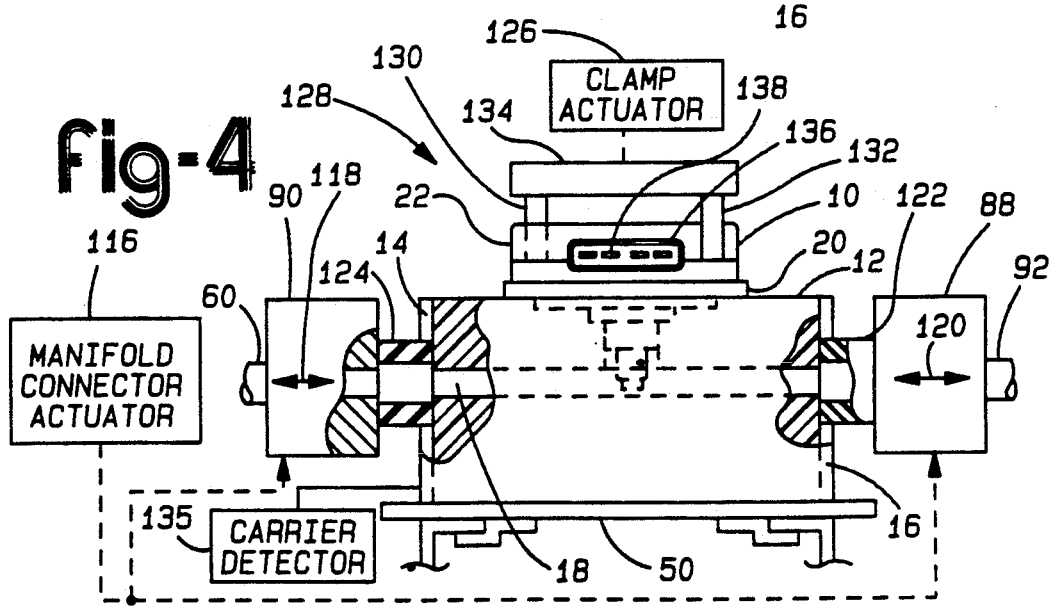

2

MASS AIR FLOW SENSOR TWO TEMPERATURE PRODUCTION LINE TEST APPARATUS

TECHNICAL FIELD

The invention is related to the field of mass air flow sensors and in particular to a production line test apparatus for measuring the output signals generated by the mass air flow sensor in response to a known air flow at two different temperatures.

BACKGROUND ART

With the advent of electronic fuel control systems for internal combustion engines, a sensor for detecting the quantity of air being supplied to the engine is required. This information is required by the electronic fuel control system to accurately control the quantity of fuel being supplied to the engine to maintain the desired air/fuel ratio. In early electronic fuel control systems, the quantity of air being supplied to the engine was computed from the engine speed and absolute pressure of the air in the air intake manifold of the engine. More recently, mass air flow sensors have been developed to measure the mass flow rate of the air through the engine's air intake manifold. For the electronic fuel control system to accurately control the quantity of fuel being delivered to the engine, the mass air flow sensor must be accurately calibrated as a function of mass air flow rates and as a function of temperature.

In the current production of mass air flow sensors, the sensors are loaded into a cold chamber are temperature soaked until they achieve the temperature of the cold chamber. The mass air flow sensors are then manually loaded into a cold test station and its output signal is measured and stored. After the cold test, the mass air flow sensor is removed from the cold test station and placed in a hot chamber where it is temperature soaked until it reaches the temperature of the hot chamber. After reaching the temperature of the hot test chamber, the output signal is measured in a hot test station.

The problem with this method is that the mass air flow rate in the cold and hot test stations are different and as a result the calibration of the mass air flow sensor as a function of temperature is not repeatable making the calibration less than desired for the accurate computation of the fuel for the engine.

The invention is a production test apparatus for measuring the output signals of the mass air flow sensors at two different temperatures in which the air flow rate at both temperatures is the same.

SUMMARY OF THE INVENTION

The invention is a production two temperature test apparatus for measuring the output signals of mass air flow sensors at two different temperatures in which the mass air flow rate being detected by the mass air flow sensors at the two temperatures are substantially equal.

The advantage of the two temperature test apparatus is that the mass air flow rate being detected by the mass air flow sensor at both temperatures are substantially the same.

Another advantage of the two temperature test apparatus is that the mass air flow rate is controlled by a sonic nozzle operating under sonic conditions making the mass air flow for both test stations repeatable.

Another advantage is that the test apparatus measures the temperature and the pressure of the air immediately upstream of the sonic nozzle which permits a highly accurate determination of the mass air flow rate in the test apparatus.

In the two temperature test apparatus, the mass air flow sensor is mounted on a carrier which is mountable on a production line. The carrier has a transverse air passage which simulates the air passage in which the mass air flow rate is to be detected in its intended application. The sensing head of the mass air flow sensor extends into the transverse air flow passage of the carrier when it is mounted thereon.

The two temperature test apparatus includes a cold test chamber having a cold test station and a hot test chamber having a hot test station. The cold test chamber is maintained at room temperature, approximately 23° C., and the hot test chamber is maintained at an elevated temperature of approximately 80° C. A production line transports the carriers with the mass air flow sensors mounted thereon. The size of the hot and cold test chambers is selected so that the mass air flow sensors reside in the hot and cold test chambers before reaching the associated test station a time sufficient to reach and stabilize at the temperature of the test chamber.

A first air manifold connects the cold test station to a vacuum chamber. The first air manifold has a sonic nozzle and temperature and pressure sensors upstream of the sonic nozzle permitting an electrical control to accurately determine the mass air flow through the first air manifold. A second air manifold is connected between the cold test station and the hot test station. A heat exchanger is connected to the second air manifold to cool the hot air flowing in the second air manifold from the hot test station before it reaches the cold test chamber. The hot test station is connected to a filter which filters the air entering the hot test station.

The cold test chamber has a first manifold connector which connects the first air manifold to one end of the air flow passage of the carrier in the cold test station and a second manifold connector which connects the opposite end of the air flow to the second air manifold. In a like manner, the hot test station has a first manifold connector which connects the opposite end of the second air manifold to one end of the air flow passage of the carrier in the hot test station and a second manifold connector which connects the other end of air flow passage to the filter through the third air manifold. The first, second and third air manifolds in combination with the air flow passages in the carriers located in the cold and hot test stations form a continuous manifold through which the mass air flow is controlled by the sonic nozzle under sonic air flow conditions. Means are provided in both the hot and cold test stations to connect the mass air flow sensor to the electrical control. The electrical control will energize the mass air flow sensors and store their respective output signals. These signals are subsequently used to determine the degree which selected resistance are to be trimmed by a laser trimmer to reduce the temperature sensitivity of the mass air flow sensor to within predetermined limits.

The cold and hot test stations also have means for clamping the mass air flow sensor to the carrier to compress the mass air flow sensor's O-ring seal preventing air from leaking into the air manifolds adversely affecting the air flow through the air flow passages of the carriers being measured by the mass air flow sensors.

The structural details and other advantages of the two temperature test apparatus can be obtained by reading the specification in conjunction with the drawings.

BRIEF DESCRIPTION OF THE DRAWINGS

FIG. 2 is a top view of the mass air flow sensor mounted on a production carrier.

FIG. 3 is a cross-section side view of the carrier.

FIG. 4 is a frontal view of a test station showing the manifold connectors and the clamping mechanism.

BEST MODE FOR CARRYING OUT THE INVENTION

Figure 1:
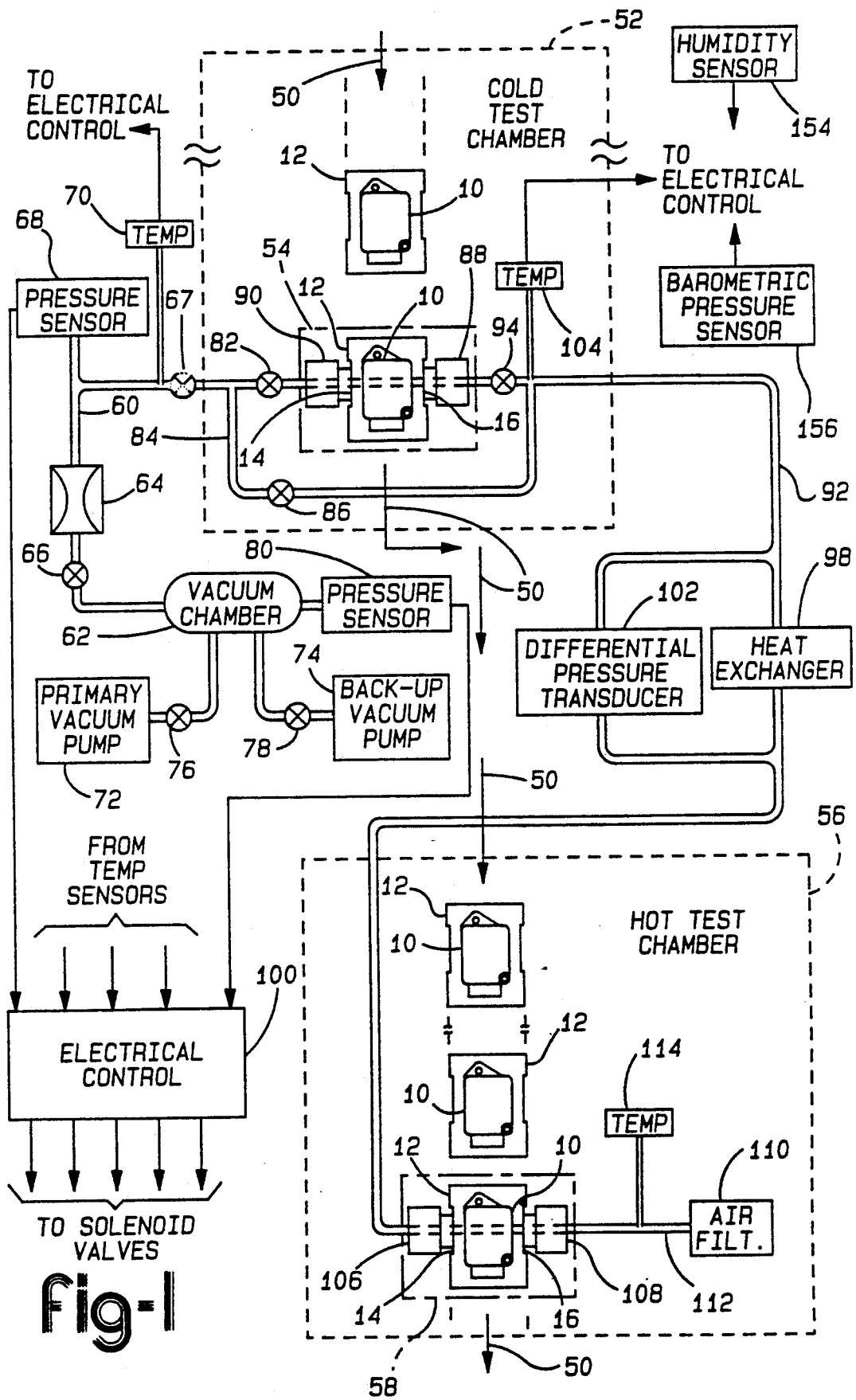
FIG. 1 is a diagram of the two temperature test apparatus.

The details of the production line two temperature test apparatus for a mass air flow sensor are shown on FIG. 1. The mass air flow sensors are assembled, tested and calibrated on an automated production line. During these procedures, the mass air flow sensor 10 is mounted on a production line carrier 12 as shown in FIGS. 2 and 3. The carrier 12 has a generally rectangular shape as shown in FIG. 2. Two opposing sides of the carrier 12 have recessed seating surfaces 14 and 16 which are at the opposite ends of a transverse air flow passage is as shown in FIG. 3. The air flow passage 18 simulates, in size and profile of the air flow passage whose mass air flow is to be detected by the mass air flow sensor in its intended application.

The mass air flow sensor 10 has a base plate 20, a housing 22 and a sensing head 24. The sensing head 24 has a pair of sensing elements 26 and 28 which are centrally disposed within the air flow passage 18 when the base plate 20 of the mass air flow sensor 10 engages the top surface 30 of the production line carrier 12.

The sensing head 24 has a collar 32 which is received in a well 34 of the carrier 12. An O-ring 36 circumscribes sensing head 24 just below the collar 32. The O-ring 36 is compressed between the collar 32 and the bottom 38 of the well 34 when the base plate 20 is clamped to the top surface 30 of the carrier. A sensing head port 40 connects the bottom 38 of the well 34 with the air flow passageway 18. A pair of alignment pins 42 and 44 protrude from the top surface 30 of the carrier and are received in mounting holes 46 and 48 provided in the base plate 20 and housing member 22 of the mass air flow sensor 10. The alignment pins 42 and 44 align the base plate 20 and the attached sensing head 24 with the well 34 and the sensing head port 40. The mass air flow sensor 10 also has an electrical connector 136 through which electrical power is supplied to the mass air flow sensor and the signal generated by the mass air flow sensor is transmitted to a remote utilization device.

Returning now to FIG. 1, the carriers 12 with the attached mass air flow sensor 10 are mounted on a production line symbolized by the chain of arrows 50. The chain of arrows 50 also indicates the direction in which the production line is moving. The production line first passes through a cold test chamber 52 which includes a cold test station 54 and then passes into a hot test chamber 56 having a hot test station 58. The structure of the hot and cold test stations 54 and 58, respectively, are substantially the same and shall be discussed in greater detail with reference to FIGS. 4 and 5. The cold test chamber is preferably maintained at a temperature of 22.5° C. (68° F.) and the hot test chamber is maintained at a temperature of approximately 80° C. (160° F.).

Figure 6:
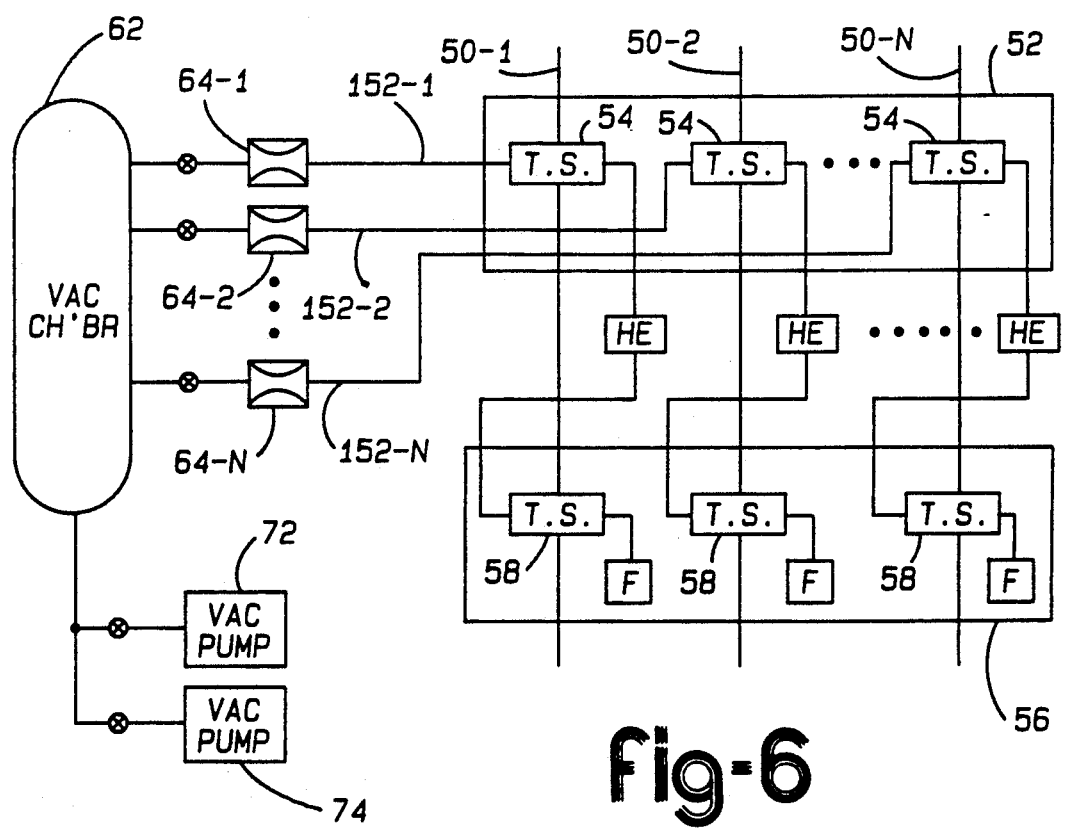
FIG. 6 is a block diagram showing multiple test stations in each of the cold and hot test stations.

The hot and cold test chambers 52 and 56 are elongated structures such that each carrier on the production line remains in the hot and cold test chamber for a period of time, about 10 to 15 minutes, before it reaches the test station so that the temperature of the mass air flow sensor 10 will reach and stabilize at the test chamber's temperature before it enters the associated test station. Although in FIG. 1, there is only one test station in each test chamber, it is contemplated that a plurality of production lines, indicated as lines 50-1 through 50-N, will pass through each hot and cold test chamber 52 and 56, respectively, and that a test station will be associated with each production line in both the cold test chamber 52 and the hot test chamber 56 as shown in FIG. 6.

Returning to FIG. 1, the two temperature test apparatus has a first manifold 60 connected at one end to a vacuum chamber 62 and at the other end to the cold test station 54. The first manifold has a sonic nozzle 64 which, in a known manner, controls the mass air flow through the first manifold 60. An ON-OFF valve 66 is connected between the sonic nozzle 64 and the vacuum chamber 62. The ON-OFF valve 66 may be a solenoid valve, a pneumatic valve or any other type of remotely actuated valve known in the art. A highly accurate pressure sensor 68 and a highly accurate temperature sensor 70 accurately measures the pressure and temperature of the air in the first manifold 60 upstream of the sonic nozzle 64. A variable control valve 67, shown in phantom, may be inserted between the sonic nozzle 64 and the cold test chamber 52 to control the air pressure in the first manifold 60 upstream of the sonic nozzle to trim the mass air flow through the cold test chamber 52 and the hot test chamber 56 if necessary or desired.

A primary vacuum pump 72 and a secondary vacuum pump 74 maintain a low pressure in the vacuum chamber 62. The secondary vacuum pump 74 is a back-up vacuum pump and is used in the event of a failure or maintenance servicing of the primary vacuum pump 72. Valves 76 and 78 control which vacuum pump is evacuating the vacuum chamber 62. A pressure sensor 80 monitors the pressure in the vacuum chamber 62.

An electrical control 100 computes the mass air flow through the sonic nozzle 64 and therefore the mass air flow through the first manifold 60 from the pressure detected by pressure sensor 68 upstream of the sonic nozzle 64, the pressure in the vacuum chamber 62 measured by pressure sensor 80 and the temperature of the air measured by temperature sensor 70, air humidity measured by a humidity sensor 154 and the barometric pressure measured by a barometric pressure sensor 156. The humidity sensor 154 and barometric pressure sensor are mounted external to the hot test chamber 56 and the cold test chamber 52. In this way, the mass air flow through the sonic nozzle 64 and, therefore, the first manifold 60 is accurately determined.

An outlet valve 82 is disposed at the end of the first manifold 60 adjacent to the cold test station 54. Downstream of the outlet valve 82, the first manifold 60 has a first bypass branch 84 which terminates with a bypass valve 86.

The cold test station 54 has an air flow input connector 88 which engages sealing surface 16 of the carrier 12 located in the cold test station. The cold test station 54 also has an air flow outlet connector 90 connected to the valve 82. The air flow outlet connector engages sealing surface 14 of the carrier 12.

The air flow inlet connector 88 is connected to a second manifold 92 through inlet valve 94. The second manifold has a second bypass branch 96 connected to bypass valve 86. The opposite end of the second manifold 92 is connected to the hot test station 58 through a heat exchanger 98. A highly accurate differential pressure transducer 102 measures the differential pressure across the heat exchanger and effectively serves as a leak detector. A temperature sensor 104 generates a temperature signal indicative of temperature of the air in the second manifold 92 just prior to entering the cold test station 54. The temperature signal is stored in the electrical control 100.

The hot test station 58 has an outlet connector 106 connected to the second manifold 92 and an inlet connector 108 connected to an air filter 110 by a third manifold 112. A temperature sensor 114 measures the temperature of the air flowing in the third manifold 112. The air filter 110 is disposed inside of the hot test chamber 56, therefore, the temperature of the air entering the third manifold 112 is approximately the same as the hot test chamber. This air is cooled by the heat exchanger 96 prior to entering the cold test station 54.

Figure 5:
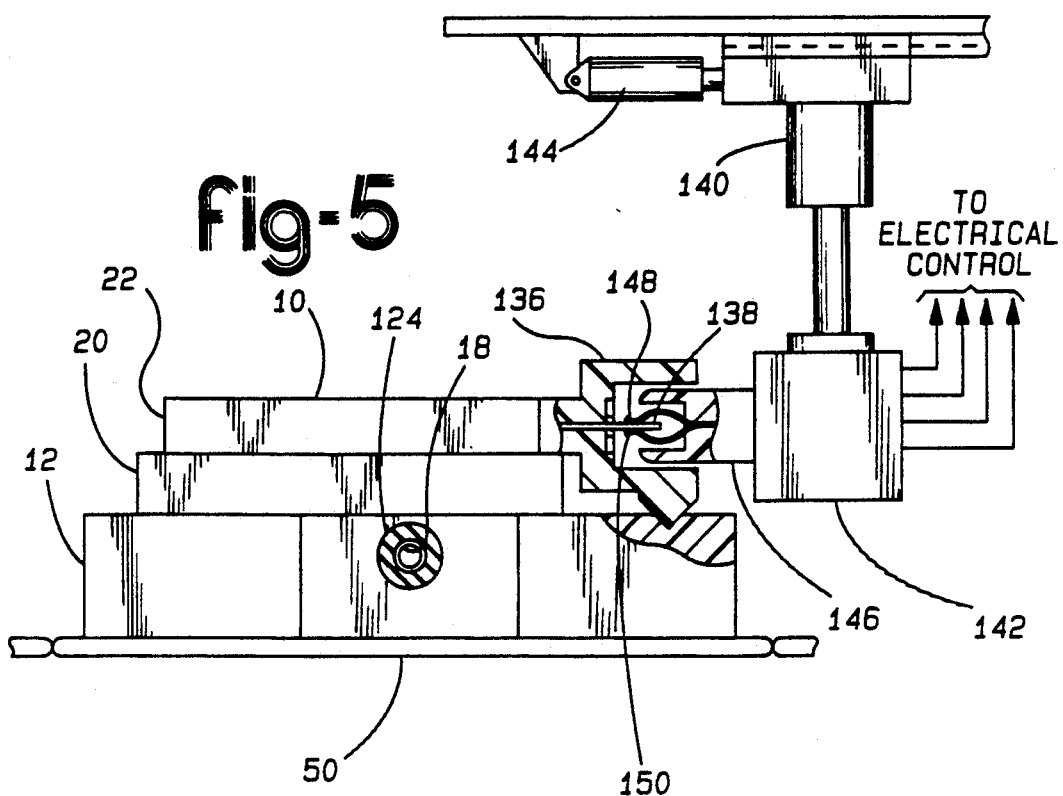
FIG. 5 is a side view of a test station showing the details of the electrical connection to the mass air flow sensor.

The structure of the cold test station 54 is shown in FIGS. 4 and 5. The structure of the hot test station 58 is substantially the same as the structure of the cold test station 54 and, therefore, need not be repeated for an understanding of the invention.

Referring first to FIG. 4, the inlet connector 88 and the outlet connector 90 are linearly displaced by a manifold connector actuator to move into engagement with the sealing surfaces 16 and 14 of the carrier 12, respectively. As indicated by double headed arrows 118 and 120, the inlet connector 88 and the outlet connector 90 move in a generally horizontal direction transverse to the direction of motion of the production line 50. The inlet connector 88 has an annular resilient seal member 122 which sealingly engages the recessed sealing surface 16 of the carrier. The hollow central portion of the annular seal member 122 is substantially aligned with the air flow passage 18 of the carrier 12. In a like manner, the outlet connector 90 has an annular resilient seal member 124 which sealingly engages the recessed sealing surface 14, and the hollow central portion of the annular seal member 124 is substantially aligned with the air flow passage 18 of the carrier 12. The internal diameter of the annular seal members 122 and 124 are larger than the diameter of the air flow passage 18 so that they will not occlude the air flow passage when the annular seal members 122 and 124 engage the sealing surfaces 14 and 16. Preferably, the inlet and outlet connectors 88 and 90, respectively, are moved simultaneously towards and away from each other to avoid lateral forces being placed on the carrier 12 during the engagement and disengagement of the inlet and outlet connectors with the recessed sealing surfaces 16 and 14, respectively.

The cold test station 54 also has a clamp actuator 126 which vertically moves a clamp mechanism 128 to clamp the base plate 20 of the mass air flow sensor 10 against the top surface 30 of the carrier. The clamp mechanism consists of a pair of clamping posts 130 and 132 which engage the housing member 22 in a region circumscribing or adjacent to the alignment pins 42 and 44. The posts 130 and 132 are attached to a post holder 134 which is moved in a substantially vertical direction by the clamp actuator 26. The clamp mechanism 128 will clamp the housing member 22 and the attached base plate 20 onto the top surface 30 of the carrier 12, compressing the O-ring 36 between the collar 30 and the bottom 38 of the well 34. This seals the sensing head port 40 so that any air flow through the air flow passage 18 of the carrier 12 is limited to the calibrated air flow through the first and second manifolds, 60 and 92, respectively. After the test is completed, the clamp actuator 126 will raise the clamp mechanism 128 a distance sufficient to permit the carrier and the mass air flow sensor 10 to be moved out of the test station. A carrier present detector, such as optical sensor 135, detects the presence of a carrier in the cold test station and generates a carrier present signal. The electrical control in response to the carrier present signal activates said manifold connector actuator 116 and the clamp actuator 126.

FIG. 5 shows the structure for making electrical connection between the electrical control 100 and the mass air flow sensor 10 in the test station. As previously discussed, the housing member 22 of the mass air flow sensor has a male electrical connector 136 having a plurality of contact blades 138 as shown in FIGS. 4 and 5. As the inlet and outlet manifold connectors 88 and 90 are displaced to connect the first and second manifolds to the carrier 12, a first connector actuator 140 lowers a connector member 142 into alignment with the male electrical connector 136. A second connector actuator 144 horizontally displaces the first connector actuator 140 and the guide portion 146 of the connector member 142 into the male electrical connector 136 engaging spring contacts 148 and 150 with the contact blades 138. A pair of spring contacts 148 and 150 are provided for each contact blade 138 of the electrical connector 134. The spring contacts 148 and 150 are sufficiently flexible to prevent a lifting of the housing member 22 when they engage the contact blades 138 against the force of the clamping mechanism 128. This prevents the connector member 142 from lifting the housing member 22 and the base plate 20 relative to the top surface of the carrier decompressing the O-ring 36.

As is known in the art, the compound movement of the connector member 142 may be performed by a single actuator or, in the alternative, the connector member 142 may be pivotally mounted and rotated to make the required electrical connection.

In operation, each mass air flow sensor 10 mounted on the carrier 12 is indexed into the cold test chamber 52 on the production line 50. The temperature of the cold test chamber is maintained approximately 22.5° C. (room temperature). The length of the cold test chamber is selected to let the mass air flow sensor stabilize at the temperature of the cold test chamber before it is indexed into the cold test station 54. After it is indexed into the cold test station 54, the manifold connector actuator 116 is actuated to displace the inlet connector 88 and outlet connector 90 into sealing contact with the recessed sealing surfaces 16 and 14, respectively. The clamp actuator is activated to displace the clamp mechanism 128 to clamp the base plate 20 onto the top surface 30 of the carrier 12. The first and second connector actuators 140 and 144 are sequentially actuated to insert the connector member 142 into the mass air flow sensor's male electrical connector 136 electrically connecting the mass air flow sensor 10 to the electrical control 100. Valve 66 is then opened causing an air flow through at least the first and second manifolds 60 and 92 respectively controlled by the sonic nozzle 64. The electrical control 100 will compute the mass air flow through the sonic nozzle from the values generated by pressure sensors 68 and 80 and temperature sensor 70. Simultaneously, the electrical control 100 via connector member 142 will read and store the value of the output signal generated by the mass air flow sensor 10 in the cold test station. After the output signal is read and stored, the valve 66 is closed, the inlet connector 88 and outlet connector 90 are withdrawn from the carrier 12, the mass air flow sensor is unclamped from the top surface of the carrier and the electrical connector 142 is withdrawn from the mass air flow sensor's male electrical connector 136. The carrier 12 and its attached mass air flow sensor are then indexed by the production line into the hot test chamber 56.

The temperature of the hot test chamber is approximately 80° C. and its length is selected so that the mass air flow sensor will reside in the hot test chamber 56 for a time sufficient to allow the mass air flow sensor to stabilize at the temperature of the hot test chamber 56, approximately 10 to 15 minutes, prior to being indexed into the hot test station 58. After being indexed into the hot test station 58, a manifold connector actuator (not shown) will displace the inlet connector 108 and the outlet connector 106 into sealing contact with the recessed sealing surfaces 16 and 14 respectively of the carrier. The base plate is clamped to the top surface of the carrier and actuators, corresponding to actuators 140 and 144, will insert connector member 142 into the male electrical connector 136 of the mass air flow sensor 10 electrically connecting the mass air flow sensor to the electrical control 100.

If a carrier and mass air flow sensor are not in the cold test station 54, the electrical control 100 will close valves 82 and 94 and open valve 86 connecting the second manifold 92 to the first manifold 60 via bypass manifold portions 84 and 86. If a carrier 12 and mass air flow sensor are in the cold test station 54, valves 92 and 94 are opened and valve 86 is closed. The air will now flow through the air flow passage 18 of the carrier 12 in the cold test station 54. The opening of valve 66 will, as previously described, provide a calibrated air flow through the air flow passage 18 of the carrier in the hot test station 58. Again, the mass air flow through the air flow passage 18 in carrier 12 in the hot test station 58 is precisely calibrated using the pressure signals generated by pressure sensors 68 and 80 and the temperature signal generated by temperature sensor 70. The output signal generated by the mass air flow sensor is read and stored by the electrical control 100.

The output signals generated by the mass air flow sensor at the cold test station and the hot test station are used by a laser trimmer apparatus (not shown) to trim selected resistors in the mass air flow sensors so that the output of the mass air flow sensor will be substantially independent of its temperature.

As shown in FIG. 6, a plurality of production lines designate lines 50-1 through 50-N may be incorporated in both the cold test chamber 52 and the hot test chamber 56. Each production line 50-1 through 50-N has its own cold test station 54 and its own hot test station 58. Each hot and cold test station 54 and 56 are connected to the vacuum chamber 62 by its own manifold network 152-1 through 152-N as indicated. Each manifold network 152-1 through 152-N is substantially identical to the manifold network of FIG. 1 and consists of the equivalent of the first manifold 60, the second manifold 92, the third manifold 112 and associated valves discussed relative to FIG. 1. The manifold networks 152-1 through 152-N also include an associated sonic nozzle 64-1 through 64-N.

In this manner, the mass air flow sensor throughput of the two temperature test apparatus can be adjusted to accommodate production requirements.

Figure 7:
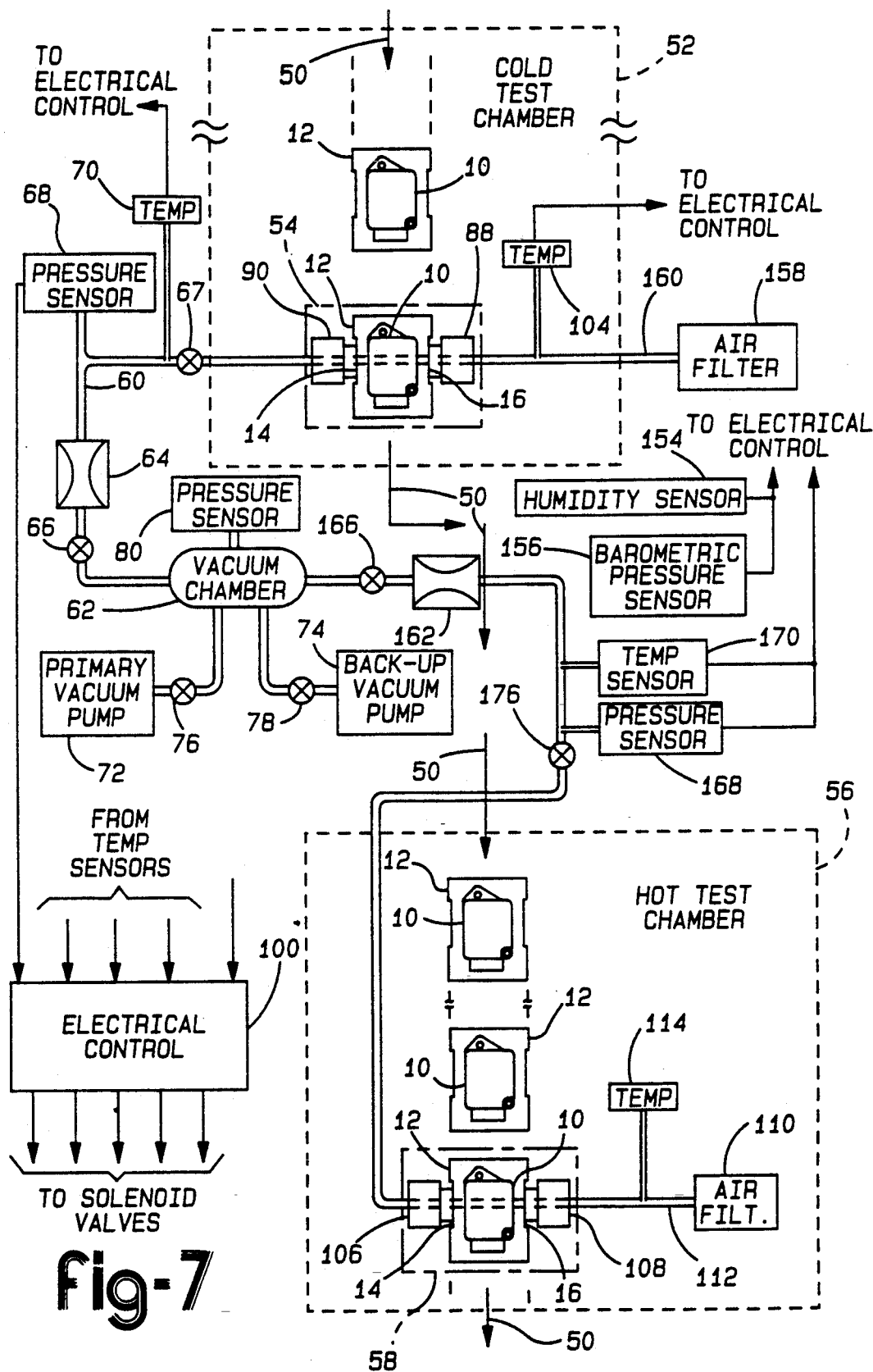
FIG. 7 is an alternate embodiment of the two temperature test apparatus.

An alternate embodiment is shown on FIG. 7. In this embodiment, the second manifold 92, the first and second bypass branches 84 and 96 along with valves 82, 86 and 94 are eliminated and the inlet to the cold test station 54 is connected to an air filter 158 by an air inlet manifold 160.

The outlet of the hot test chamber 56 is connected to a second sonic nozzle 162 by an outlet manifold 164. The opposite end of the sonic nozzle is connected to the vacuum chamber 62 through a second ON-OFF valve 166. Variable control valves 67 and 167 control the air pressure in the first manifold 60 and the outlet 164 upstream of the sonic nozzles 64 and 162, respectively. Pressure sensor 168 and temperature sensor 170 measure the pressure and temperature of the air from the hot test chamber as it passes through the sonic nozzle. The signals from the pressure sensor and temperature sensor are transmitted to the electrical control 100 and are used to compute the mass air flow through the hot test chamber. The variable control valves 67 and 167 are used to adjust the air pressure upstream of the sonic nozzles 64 and 162 so that the mass air flow through the hot and cold test stations 54 and 58, respectively, are equal.

It is not intended that the two temperature test apparatus be limited to the structures shown in the drawings and described in the specification. It is recognized that those skilled in the art may make changes and improvements within the scope of the appended claims.

I claim:

1. A production line test apparatus for measuring the output of a mass air flow sensor at two different temperatures, the mass air flow sensor being mounted on a production line carrier having an air flow passage provided therethrough, said test apparatus comprising:

a cold test chamber having a cold test station provided therein, said cold test station having an air inlet port and an air outlet port, said cold test chamber being maintained at a predetermined cold temperature;

at least one production line for sequentially transporting production line carriers through said cold test chamber, each production line carrier having a mass air flow sensor mounted thereon and having at least one sensing element disposed in said air flow passage, said at least one production line indexing said production line carriers into said cold test station one at a time;

a vacuum chamber;

a first manifold connecting said air outlet port of said cold test station to said vacuum chamber;

a sonic nozzle disposed in said first manifold for controlling the mass air flow rate through said first manifold and through said air flow passage of said carrier to have a determined value;

an electrical control having means for energizing said mass air flow sensor and for storing an output signal generated by said mass air flow sensor in response to being energized;

means for electrically connecting said mass air flow sensor in said cold test station to said electrical control, said electrical control energizing said mass air flow sensor to generate a first output signal at said predetermined cold temperature at an air flow rate having said determined value; said electrical control storing said first output signal;

a hot test chamber having a hot test station provided therein, said hot test station having an air inlet port and an air outlet port, said hot test chamber being maintained at a predetermined hot temperature, said at least one production line further transporting said production line carriers through said hot test chamber, said at least one production line indexing said carriers into said hot test station one at a time;

a second manifold connecting said air inlet port of said cold test station to said air outlet port of said hot test station;

means for electrically connecting said mass air flow sensor in said hot test station to said electrical control, said electrical control energizing said mass air flow sensor in said hot test station to generate a second output signal at said predetermined hot temperature and at an air flow rate having said determined value, said electrical control storing said output signal.

2. The test apparatus of claim 1 wherein said first manifold further includes:

a first pressure sensor generating a first pressure signal indicative of the pressure in said first manifold upstream of said sonic nozzle; and a second pressure sensor generating a second pressure signal indicative of the pressure in said vacuum chamber;

a first temperature sensor generating a first temperature signal indicative of the temperature of the air in said first manifold upstream of said sonic nozzle; and wherein said electrical control includes means for accurately determining the mass air flow through said sonic nozzle in response to said first and second pressure signals and said temperature signal.

3. The test apparatus of claim 1 further including a valve controlling the air flow through said first manifold in response to a carrier being indexed into a respective one of said cold test station and said hot test station.

4. The test apparatus of claim 3 wherein said cold test station comprises:

means responsive to the indexing of a carrier into said cold test station for connecting said first manifold to one end of said air flow passage of said carrier in said cold test station; and means responsive to the indexing of said carrier into said cold test station for connecting said second manifold to the opposite end of said air flow passage of said carrier in said cold test station.

5. The test apparatus of claim 4 wherein said mass air flow sensor has an O-ring compressible to seal said mass air flow sensor on said carrier, said cold test station further comprises a clamping mechanism responsive to the indexing of said carrier into said cold test station to clamp said mass air flow sensor onto a top surface of said carrier to compress said O-ring.

6. The test apparatus of claim 3 wherein said hot test chamber further comprises:

an air filter disposed in said hot test chamber; and a third manifold connecting said inlet port of said hot test station to said air filter.

7. The test apparatus of claim 6 wherein said hot test station comprises:

means responsive to indexing said carrier in said hot test station for connecting said second manifold to one end of said air flow passage of said carrier in said hot test station;

means responsive to indexing said carrier in said hot test station for connecting said third manifold to the opposite end of said air flow passage of said carrier in said hot test.

8. The test apparatus of claim 7 wherein said mass air flow sensor has an O-ring compressible to seal said mass air flow on said carrier, said hot test station further comprises a clamping mechanism responsive to the indexing of said carrier into said hot test station to clamp said mass air flow sensor onto a top surface of said carrier to compress said O-ring.

9. The test apparatus of claim 8 further including a variable flow control valve disposed in said first manifold upstream of said sonic nozzle for controlling the pressure in said first manifold upstream of said sonic nozzle.

10. The test apparatus of claim 6 wherein said cold test station comprises:

means for detecting the indexing of a carrier into said cold test chamber to generate a carrier present signal;

a first manifold connector connected to said first manifold;

a second manifold connector connected to said second manifold; and a cold test station manifold connector actuator for displacing said first and second manifold connectors to engage opposite sides of said carrier connecting said first and second manifolds to opposite ends of said air flow passage; and wherein said electrical control is responsive to said carrier present signal to activate said cold test station manifold connector actuator.

11. The test apparatus of claim 10 wherein said hot test station comprises:

means for detecting the presence of a carrier in said hot station to generate a carrier present signal;

a third manifold connector connected to said second manifold;

a fourth manifold connector connected to said third manifold; and a hot test station manifold connector actuator for displacing said third and fourth manifold connectors to engage opposite sides of said carrier connecting said second and third manifolds to opposite ends of said air flow passage of said carrier in said hot test station; and wherein said electrical control is responsive to said carrier present signal to activate said hot test station manifold connector actuator.

12. The test apparatus of claim 1 further comprising a heat exchanger connected to said second manifold for cooling said air between said hot test station and said cold test station.

13. The test apparatus of claim 12 further comprising a differential pressure sensor connected to said second manifold in parallel with said heat exchanger.

14. The test apparatus of claim 1 further comprising:

a bypass manifold connected in parallel with said cold test station between said first manifold and said second manifold a second valve connected to said first manifold between said bypass manifold and said outlet port of said cold test station;

a third valve connected to said second manifold between said bypass manifold and said inlet port of said cold test station;

a fourth valve connected to said bypass line intermediate said first and second manifolds; and wherein said electrical control is further responsive to the indexing of a carrier into said cold test station by said production line to open said second and third valves and close said fourth valve and responsive to the absence of a carrier in said cold test station to close said second and third valves and open said fourth valve.

15. The test apparatus of claim 1 wherein said at least one production line comprises a plurality of production lines passing through said cold and hot test chambers, each production line of said plurality of production lines having an associated sonic nozzle, an associated cold test station and an associated hot test station in said cold and hot test chambers, respectively.

16. The test apparatus of claim 1 wherein the length of said hot test chamber is selected so that each mass air flow sensor being carried by said at least one production line remains in said hot test chamber before entering said hot test station a time sufficient for each mass air flow sensor to heat soak and stabilize at the temperature of said hot test chamber.

17. A test apparatus for measuring the output of a mass air flow sensor at two different temperatures, the mass air flow sensor being mounted on a production line carrier having a transverse air flow passage provided therethrough in which the sensing head of said mass air flow sensor is disposed, said test apparatus comprising:

a cold test chamber having a cold test station;

a hot test chamber having a hot test station;

a vacuum chamber;

a first air manifold connecting said cold test chamber to said vacuum chamber, said first air manifold including a sonic nozzle controlling the mass air flow through said first air manifold;

a second air manifold connecting said cold test station to said hot test station, said second air manifold having a heat exchanger intermediate said cold test station and said hot test station;

said cold test station having means for connecting said first and second air manifolds to opposite ends of said air flow passage in each carrier, one at a time, to direct the air flow in said first and second air manifolds through said air flow passage;

said hot test station having means for connecting said second air manifold to one end of said air flow passage in each carrier, one at a time, to direct the air flow in said first and second air manifolds through said air flow passage;

means for activating said mass air flow sensor in said cold test station to generate a first signal;

means for activating said mass air flow sensor in said hot test station to generate a second signal;

means for storing said first and second signals generated by said mass air flow sensors in said cold and hot test stations, respectively; and conveyor means for sequentially transporting said carriers into said cold test station and said hot test station, one at a time.

18. The test apparatus of claim 17 wherein said hot test chamber has a length sufficient for said mass air flow sensors being transported therethrough by said conveyor means to reach and stabilize at the temperature of said hot test chamber before being indexed into said hot test station.

19. The test apparatus of claim 17 further including a variable flow control valve disposed in said first air manifold upstream of said sonic nozzle to control the pressure in said first manifold to vary said mass air flow through cold and hot test stations.

20. A production line test apparatus for measuring the output of a mass air flow sensor at two different temperatures, the mass air flow sensor being mounted on a production line carrier having an air flow passage provided therethrough in which the sensing head of said mass air flow sensor is disposed within said test apparatus comprising:

a cold test chamber having a cold test station;

a hot test chamber having a hot test station;

a source of vacuum pressure;

a first air manifold connecting said cold test station to said source of vacuum pressure, said first air manifold including a first sonic nozzle and a variable flow control valve for controlling the mass air flow through said first air manifold;

said cold test station having means for connecting said first air manifold to one end of said air flow passage of said carrier;

a second air manifold connecting said hot test station to said source of vacuum pressure, said second air manifold including a second sonic nozzle and a second variable control valve for controlling the mass air flow through said second air manifold to be equal to the mass air flow through said first air flow manifold;

said hot test station having means for connecting said second air manifold to one end of said air flow passage;

means for activating each mass air flow sensor in said cold test station to generate a first signal;

means for activating each mass air flow sensor in said hot test chamber to generate a second signal;

means for storing said first and second signals generated by said mass air flow sensor in said hot and cold test chambers; and means for sequentially transporting said carriers into said cold and hot test stations, one at a time.

* * * * *